(12) United States Patent
Singh et al.

(10) Patent No.: US 12,444,217 B2
(45) Date of Patent: Oct. 14, 2025

(54) NOTIFICATIONS IN EXTENDED REALITY ENVIRONMENTS

(71) Applicant: Citrix Systems, Inc., Fort Lauderdale, FL (US)

(72) Inventors: Manbinder Pal Singh, Coral Springs, FL (US); Christopher Fleck, Boca Raton, FL (US)

( * ) Notice: Subject to any disclaimer, the term of this patent is extended or adjusted under 35 U.S.C. 154(b) by 803 days.

(21) Appl. No.: 17/540,516

(22) Filed: Dec. 2, 2021

(65) Prior Publication Data

US 2023/0177855 A1 Jun. 8, 2023

(51) Int. Cl.
| | |
|---|---|
| G06V 30/146 | (2022.01) |
| G02B 27/01 | (2006.01) |
| G06N 3/08 | (2023.01) |
| G06V 30/148 | (2022.01) |

(52) U.S. Cl.
CPC ......... G06V 30/147 (2022.01); G02B 27/017 (2013.01); G06N 3/08 (2013.01); G06V 30/153 (2022.01); G02B 2027/0138 (2013.01); G02B 2027/014 (2013.01)

(58) Field of Classification Search
None
See application file for complete search history.

(56) References Cited

U.S. PATENT DOCUMENTS

| | | | |
|---|---|---|---|
| 11,435,593 B1* | 9/2022 | Sztuk | G06T 7/70 |
| 2017/0192620 A1* | 7/2017 | Kim | G02B 27/0179 |
| 2018/0189568 A1* | 7/2018 | Powderly | G06V 30/194 |
| 2020/0004815 A1* | 1/2020 | Weisberg | G06N 5/046 |
| 2021/0342479 A1* | 11/2021 | Schluntz | H04L 63/107 |
| 2021/0397839 A1* | 12/2021 | Qiu | G01C 21/206 |
| 2021/0407210 A1* | 12/2021 | Maggiore | H04W 4/33 |
| 2022/0044480 A1* | 2/2022 | Zavesky | G06T 15/20 |
| 2022/0101613 A1* | 3/2022 | Rockel | G06F 3/017 |
| 2023/0080905 A1* | 3/2023 | Tomczek | G06F 3/016 |
| | | | 345/156 |
| 2024/0005658 A1* | 1/2024 | Leyton | G06V 20/40 |
| 2024/0064395 A1* | 2/2024 | O'Leary | H04N 23/69 |
| 2024/0104849 A1* | 3/2024 | Nie | G06T 19/00 |

OTHER PUBLICATIONS

Orlosky, Jason. "Adaptive display of virtual content for improving usability and safety in mixed and augmented reality." (2016). (Year: 2016).*

Biener, Verena, et al. "Breaking the screen: Interaction across touchscreen boundaries in virtual reality for mobile knowledge workers." IEEE transactions on visualization and computer graphics 26.12 (2020): 3490-3502. (Year: 2020).*

* cited by examiner

Primary Examiner — Michelle M Entezari Hausmann

(57) ABSTRACT

Methods and systems for providing notifications in an extended reality (XR) environment are described herein. A computing device may provide, to a user and via an XR device, an XR environment. The computing device may detect one or more first locations of one or more display devices. At least one first display device of the one or more display devices may be in a physical environment around the XR device. The computing device may retrieve one or more notifications for display in the XR environment and determine, based on the one or more first locations of the one or more display devices, one or more second locations for the one or more notifications. The computing device may then provide, in the XR environment and at the one or more second locations, the one or more notifications.

19 Claims, 7 Drawing Sheets

NOTIFICATIONS IN EXTENDED REALITY ENVIRONMENTS

FIELD

Aspects described herein generally relate to extended reality (XR), such as virtual reality, augmented reality, and/or mixed reality, and hardware and software related thereto. More specifically, one or more aspects describe herein provide ways in which notifications may be displayed in an XR environment with respect to display devices in a physical environment around an XR device.

BACKGROUND

At any given workstation, users may maintain a variety of notes. For example, a user might use a sticky note to make notes to themselves, then stick those sticky notes on their monitor to keep the sticky note within their view. This process can be easy and convenient for the user, but might be inconvenient where the user frequently changes their workstation. This practice can also introduce a number of security vulnerabilities as well: because the sticky notes might be in full view of anyone within viewing distance, sensitive content on the sticky notes could be read by unauthorized individuals. While software for note-taking exists, such software is often cumbersome and somewhat impractical for small/quick notifications, and as such the act of physical note taking is still prevalent.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

XR display devices provide users many different types of XR environments (e.g., a virtual reality environment, an augmented reality environment, and/or a mixed reality environment). For example, a worker in an office might use augmented reality glasses to display content on top of real-world content visible through the lens of the glasses. In this manner, the worker might be able to interact with real-world, physical objects (e.g., paper, laptops, etc.) while also interacting with virtual objects in the XR environment (e.g., three-dimensional content displayed on a display of an XR device).

To overcome limitations in the prior art described above, and to overcome other limitations that will be apparent upon reading and understanding the present specification, aspects described herein are directed towards providing notifications in an XR environment. As will be described further herein, such notifications might be placed around one or more display devices in a physical environment around an XR device, such that the notifications might effectively emulate the convenience of real-world physical notes (e.g., sticky notes on a user's monitor). Indeed, the XR environment might be used to augment real-world notifications (e.g., sticky notes actually located on a user's monitor) by providing the user the ability to interact with such real-world notifications in the XR environment. Moreover, the XR environment may provide such notifications regardless of the workstation used by a user, the XR environment might be configured to ensure that sensitive data is kept private from unauthorized users, and the XR environment might be configured to prioritize notifications based on their priority.

As will be described further herein, a computing device may provide, to a user and via an XR device, an XR environment. The computing device may detect one or more first locations of one or more display devices. At least one first display device of the one or more display devices may be in a physical environment around the XR device. At least one second display device of the one or more display devices may be a virtual display device generated by the XR device. The computing device may retrieve, from a server, one or more notifications for display in the XR environment. The computing device may determine, based on the one or more first locations of the one or more display devices, one or more second locations for the one or more notifications. The one or more second locations may be determined based on a priority level of each of the one or more notifications. The computing device may provide, in the XR environment and at the one or more second locations, the one or more notifications.

The computing device may capture notification(s) by imaging a physical environment around an XR device. The computing device may capture, using an imaging device of the XR device, one or more images of the physical environment around the XR device. The computing device may determine, based on the one or more images, at least one notification. Determining the at least one notification may comprise determining text in the one or more images using an Optical Character Recognition (OCR) algorithm and determining the at least one notification based on the text. Then, the computing device may send, to the server, the at least one notification, wherein the one or more notifications comprise the at least one notification. In some instances, this process might entail use of a machine learning model. For example, the computing device may capture, using an imaging device of the XR device, one or more images of the physical environment around the XR device and then provide, to a trained machine learning model, input comprising the one or more images. The trained machine learning model may have been trained to indicate notification locations based on training data comprising a plurality of different images. Each of the plurality of different images may comprise, for example, at least one display device and one or more written notes nearby the at least one display device. Then, the computing device may receive, from the trained machine learning model, output comprising an indication of the one or more second locations.

The notifications may be interactive, and might cause other computing devices to perform steps. The computing device may receive, in the XR environment, a user interaction with a first notification of the one or more notifications. The computing device may determine an action associated with the first notification, and then provide, via a second computing device, a user interface associated with the action. The user may be able to interact, via the XR environment, with physical notes. For example, the computing device may receive, in the XR environment, a user interaction with a physical note in the physical environment around the XR device. The computing device may determine a first notification corresponding to the physical note. The computing device may then determine an action associated with the first notification and provide a user interface associated with the action.

The notifications may be presented with respect to a bounding box of a display device. As part of determining the one or more second locations, the computing device may determine a bounding box corresponding to a first display device of the one or more display devices. Then, the computing device may determine the one or more second locations based on the bounding box.

The notifications may be generated by a user. For example, the computing device may receive, from the user, a selection of text. The computing device may then generate, based on the text, at least one notification and send, to the server, the at least one notification, wherein the one or more notifications comprise the at least one notification.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
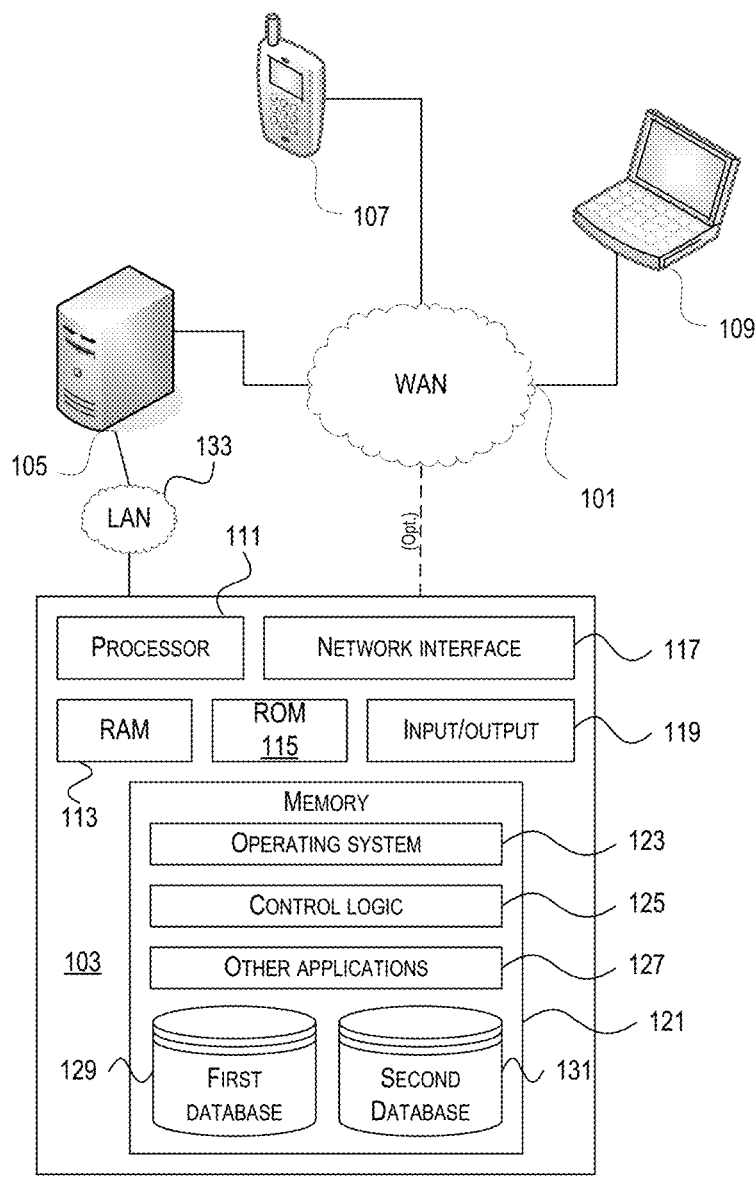
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards using XR devices to display notifications in a manner which, among other things, allows users access to notifications wherever they are, provides additional security for such notifications, and allows such notifications to be interacted with in the XR environment. The notifications might effectively replace and/or augment real-life sticky notes attached to monitors: by virtualizing such notifications and dynamically placing the notifications around real or virtual monitors, the downsides of such real-life sticky notes can be mitigated while the benefits of their use can be preserved. Indeed, one use case for the aspects described herein entails capturing images of existing real-world notes (e.g., real sticky notes on a monitor) and virtualizing those notes such that they are displayed in a wide variety of circumstances and in a manner which permits a user to interact with those real-world notes.

As will be discussed in greater detail below, the present disclosure has a large number of improvements over conventional physical and electronic note taking approaches. The present disclosure accounts for hybrid office scenarios, whereby users switch workstations (e.g., in a flexible seating scenario, and/or a scenario where users work from home occasionally) regularly and might not carry physical notes with them from workstation to workstation. The present disclosure also preserves the privacy of notifications, preventing them from being seen by unauthorized users. The present disclosure also allows users to freely create notifications in a largely unstructured format, meaning that limitations associated with formal note taking applications are avoided. The present disclosure also permits the use of contextually aware notifications, whereby notifications are prioritized and displayed based on the context of work. The present disclosure also allows users to freely share notifications between one another.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
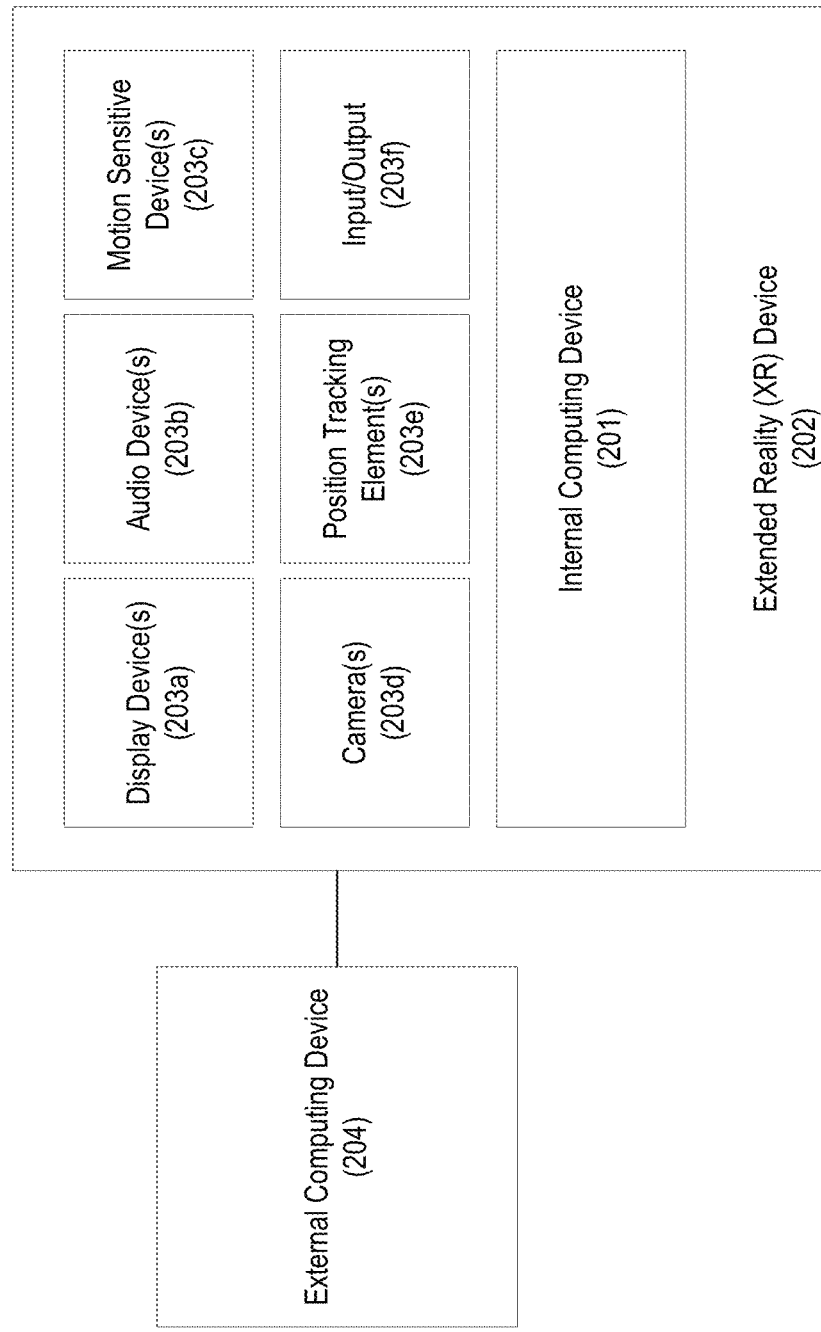
FIG. 2 depicts an illustrative extended reality (XR) device.

FIG. 2 depicts an example of an XR device 202. The XR device 202 may be configured to provide a XR environment (e.g., a virtual reality (VR), augmented reality (AR), and/or mixed reality (MR) environment). The XR device 202 may be communicatively connected to a external computing device 204, which may be the same or similar as one or more of the devices 103, 105, 107, and 109. The XR device 202 may comprise a plurality of different elements, such as display devices 203a, audio devices 203b, motion sensitive devices 203c, cameras 203d, position tracking elements 203e, and input/output 203f Such elements may additionally and/or alternatively be referred to as sensors. Other such elements, not shown, may include in-ear electroencephalographic (EEG) and/or heart rate variability (HRV) measuring devices, scalp and/or forehead-based EEG and/or HRV measurement devices, eye-tracking devices (e.g., using infrared), or the like. The XR device 202 may further comprise a internal computing device 201, which may be the same or similar as the devices 103, 105, 107, and 109. Not all elements shown in FIG. 2 need to be present for operation of the XR device 202. For example, the XR device 202 might lack a internal computing device 201, such that the external computing device 204 may directly interface with the display devices 203a, the audio devices 203b, the motion sensitive devices 203c, the cameras 203d, the position tracking elements 203e, and/or the input/output 203f to provide an XR environment. As another example, the internal computing device 201 may be sufficiently powerful enough such that the external computing device 204 may be omitted. Though the internal computing device 201 and external computing device 204 use the terms internal and external for the purposes of illustration in FIG. 2, these devices need not be, for example, located within or outside of housing of the XR device 202. For example, the external device 204 may be physically mounted to the XR device 202, a user of the XR device 202, or the like. As another example, the internal computing device 201 might be physically distant from other elements of the XR device 202 and, e.g., connected to those elements by a long cable.

The external computing device 204 and/or the internal computing device 201 need not have any particular processing power or functionality to provide an XR environment. The external computing device 204 and/or the internal computing device 201 may comprise, for example, relatively underpowered processors which provide rudimentary video and/or audio. Alternatively, the external computing device 204 and/or the internal computing device 201 may, for example, comprise relatively powerful processors which provide highly realistic video and/or audio. As such, the external computing device 204 and/or the internal computing device 201 may have varying levels of processing power.

The XR device 202 may provide a VR, AR, and/or MR environment to the user. In general, VR environments provide an entirely virtual world, whereas AR and/or MR environments mix elements in the real world and the virtual world. The XR device 202 may be a device specifically configured to provide an XR environment (e.g., a VR headset), or may be a combination of devices (e.g., a smartphone inserted into a headset) which, when operated in a particular manner, provides an XR environment. The XR device 202 may be said to be untethered at least in part because it may lack a physical connection to another device (and, e.g., may be battery powered). If the XR device 202 is connected to another device (e.g., the external computing device 204, a power source, or the like), it may be said to be tethered. Examples of the XR device 202 may include the VALVE INDEX VR device developed by Valve Corporation of Bellevue, Washington, the OCULUS QUEST VR device sold by Facebook Technologies, LLC of Menlo Park, California, and the HTC VIVE VR device sold by HTC Corporation of New Taipei City, Taiwan. Examples of the XR device 202 may also include smartphones which may be placed into a headset for VR purposes, such as the GEAR VR product sold by Samsung Group of Seoul, South Korea. Examples of the XR device 202 may also include the AR headsets sold by Magic Leap, Inc. of Plantation, Florida, the HOLOLENS MR headsets sold by Microsoft Corporation of Redmond, Washington, and NREAL LIGHT headsets sold by Hangzhou Tairuo Technology Co., Ltd. of Beijing, China, among others. Examples of the XR device 202 may also include audio-based devices, such as the ECHO FRAMES sold by Amazon, Inc. of Seattle, Washington. All such VR devices may have different specifications. For example, some VR devices may have cameras, whereas others might not. These are merely examples, and other AR/VR systems may also or alternatively be used.

The external computing device 204 may provide all or portions of an XR environment to the XR device 202, e.g., as used by a tethered OCULUS RIFT. For example, the external computing device 204 may provide a video data stream to the XR device 202 that, when displayed by the XR device 202 (e.g., through the display devices 203a), shows a virtual world. Such a configuration may be advantageous where the XR device 202 (e.g., the internal computing device 201 that is part of the XR device 202) is not powerful enough to display a full XR environment. The external computing device 204 need not be present for the XR device 202 to provide an XR environment. For example, where the internal computing device 201 is sufficiently powerful, the external computing device 204 may be omitted, e.g., an untethered OCULUS QUEST.

The display devices 203a may be any devices configured to display all or portions of an XR environment. Such display devices 203a may comprise, for example, flat panel displays, such as one or more liquid-crystal display (LCD) panels. The display devices 203a may be the same or similar as the display 106. The display devices 203a may be singular or plural, and may be configured to display different images to different eyes of a user. For example, the display devices 203a may comprise one or more display devices coupled with lenses (e.g., Fresnel lenses) which separate all or portions of the displays for viewing by different eyes of a user.

The audio devices 203b may be any devices which may receive and/or output audio associated with an XR environment. For example, the audio devices 203b may comprise speakers which direct audio towards the ears of a user. As another example, the audio devices 203b may comprise one or more microphones which receive voice input from a user. The audio devices 203b may be used to provide an audio-based XR environment to a user of the XR device 202.

The motion sensitive devices 203c may be any elements which receive input related to the motion of a user of the XR device 202. For example, the motion sensitive devices 203c may comprise one or more accelerometers which may determine when a user of the XR device 202 is moving (e.g., leaning, moving forward, moving backwards, turning, or the like). Three dimensional accelerometers and/or gyroscopes may be used to determine full range of motion of the XR device 202. Optional external facing cameras 203d may be used for 3D orientation as well. The motion sensitive devices 203c may permit the XR device 202 to present an XR environment which changes based on the motion of a user. The motion sensitive devices 203c might additionally and/or alternatively comprise motion controllers or other similar devices which might be moved by a user to indicate input. As such, the motion sensitive devices 203c may be wholly or partially separate from the XR device 202, and may communicate via the input/output 203f.

The cameras 203d may be used to aid in the safety of the user as well as the presentation of an XR environment. The cameras 203d may be configured to capture images of one or more portions of an environment around the XR device 202. The cameras 203d may be used to monitor the surroundings of a user so as to avoid the user inadvertently contacting elements (e.g., walls) in the real world. The cameras 203d may additionally and/or alternatively monitor the user (e.g., the eyes of the user, the focus of the user's eyes, the pupil dilation of the user, or the like) to determine which elements of an XR environment to render, the movement of the user in such an environment, or the like. As such, one or more of the cameras 203d may be pointed towards eyes of a user, whereas one or more of the cameras 203d may be pointed outward towards an environment around the XR device 202. For example, the XR device 202 may have multiple outward-facing cameras that may capture images, from different perspectives, of an environment surrounding a user of the XR device 202.

The position tracking elements 203e may be any elements configured to aid in the tracking of the position and/or movement of the XR device 202. The position tracking elements 203e may be all or portions of a system of infrared emitters which, when monitored by a sensor, indicate the position of the XR device 202 (e.g., the position of the XR device 202 in a room). The position tracking elements 203e may be configured to permit "inside-out" tracking, where the XR device 202 tracks the position of one or more elements (e.g., the XR device 202 itself, a user's hands, external controllers, or the like) or "outside-in" tracking, where external devices aid in tracking the position of the one or more elements.

The input/output 203f may be configured to receive and transmit data associated with an XR environment. For example, the input/output 203f may be configured to communicate data associated with movement of a user to the external computing device 204. As another example, the input/output 203f may be configured to receive information from other users of in multiplayer XR environments.

The internal computing device 201 and/or the external computing device 204 may be configured to provide, via the display devices 203a, the audio devices 203b, the motion sensitive devices 203c, the cameras 203d, the position tracking elements 203e, and/or the input/output 203f, the XR environment. The internal computing device 201 may comprise one or more processors (e.g., a graphics processor), storage (e.g., that stores virtual reality programs), or the like. In general, the internal computing device 201 may be powerful enough to provide the XR environment without using the external computing device 204, such that the external computing device 204 need not be required and need not be connected to the XR device 202. In other configurations, the internal computing device 201 and the external computing device 204 may work in tandem to provide the XR environment. In other configurations, the XR device 202 might not have the internal computing device 201, such that the external computing device 204 interfaces with the display devices 203a, the audio devices 203b, the motion sensitive devices 203c, the cameras 203d, the position tracking elements 203e, and/or the input/output 203f directly.

The above-identified elements of the XR device 202 are merely examples. The XR device 202 may have more or similar elements. For example, the XR device 202 may include in-ear EEG and/or HRV measuring devices, scalp and/or forehead-based EEG and/or HRV measurement devices, eye-tracking devices (e.g., using cameras directed at users' eyes, pupil tracking, infrared), or the like.

Figure 3:
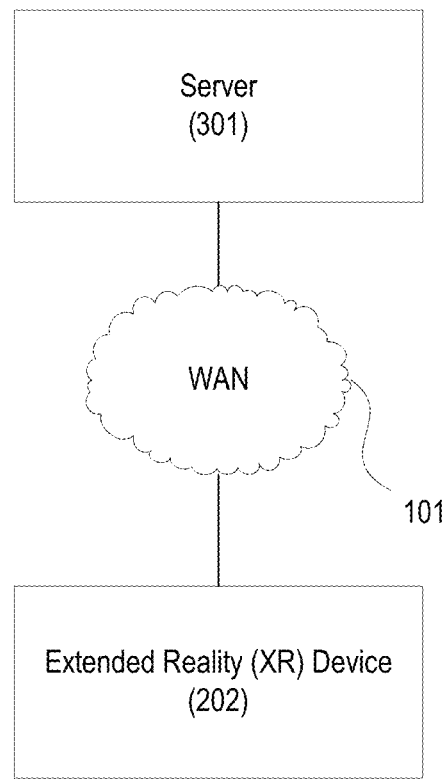
FIG. 3 depicts an XR device connected to a server via a network.

FIG. 3 shows the XR device 202 connected, via the network 101, to a server 301. The server 301 may be a computing device the same or similar as the devices 103, 105, 107, and 109. Additionally and/or alternatively, the server 301 may be the same or similar as the external computing device 204. The server 301 may be configured to generate all or portions of an XR environment displayed by the XR device 202. For example, the XR device 202 may receive, via the network 101, data (e.g., a video stream) from the server 301, and the data may comprise a virtual object which may be displayed in an XR environment. Advantageously, the server 301 may have superior computing power as compared to the XR device 202, such that content generated by the server 301 (e.g., virtual objects rendered by the server 301) may have a superior graphical quality as compared to the XR device 202.

Figure 4:
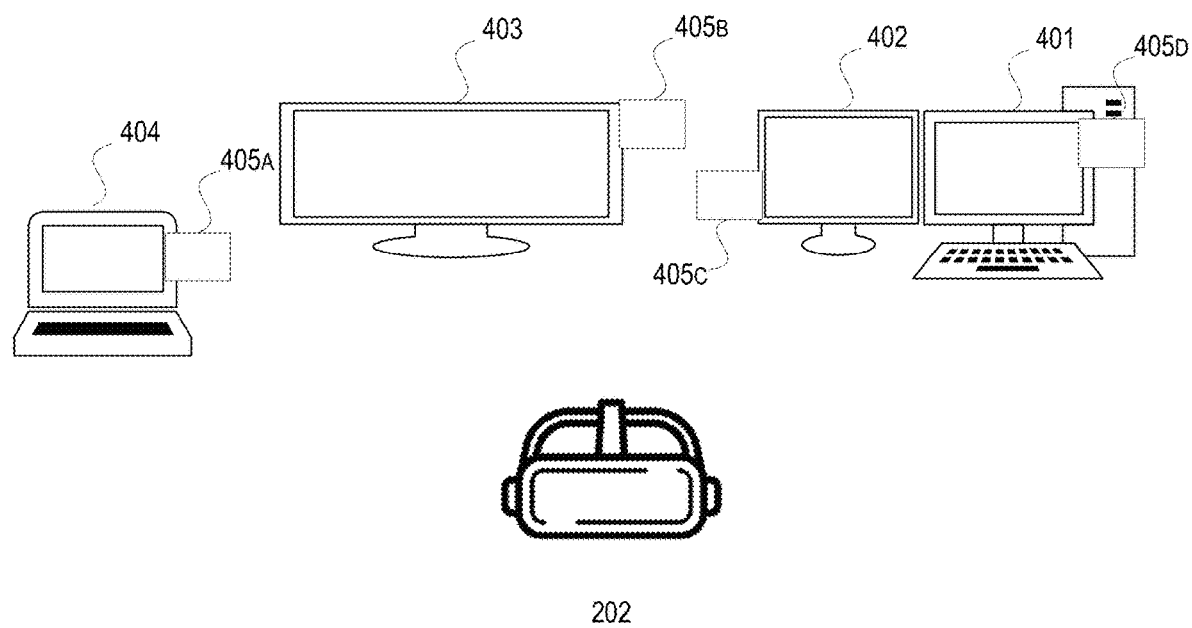
FIG. 4 depicts a physical environment about an XR device, including various physical notes.

FIG. 4 depicts a physical environment around the XR device 202. Depicted in FIG. 4 are four different display devices: a first monitor 401, a second monitor 402, a television 403, and a laptop screen 404. All such display devices may be referred to as physical display devices or real display devices in that they exist in a real-world physical environment about the XR device 202, and might not necessarily be displayed in any sort of XR environment. Also displayed are various physical notifications (e.g., sticky notes). Particularly, there is a first physical notification 405a on the laptop screen 404, a second physical notification 405b on the television 403, a third physical notification 405c on the second monitor 402, and a fourth physical notification 405d on the first monitor 401. These physical notifications are examples of the type of notifications which some users might place on their display devices to remind themselves of various information/tasks. For example, the first physical notification 405a might be configured to remind the user of a laptop to respond to an e-mail.

Display devices, such as the first monitor 401, the second monitor 402, the television 403, and the laptop screen 404, may display content generated by one or more computing devices. For example, the first monitor 401 and the second monitor 402 display different portions of a desktop environment generated by a desktop computer. As another example, the television 403 might display video content generated by a set-top box, a video game console, or the like.

Notifications in Extended Reality Environments

Having discussed several examples of computing devices, display devices, and XR devices which may be used to implement some aspects as discussed further below, discussion will now turn to notifications which may be displayed in XR environments.

Figure 5:
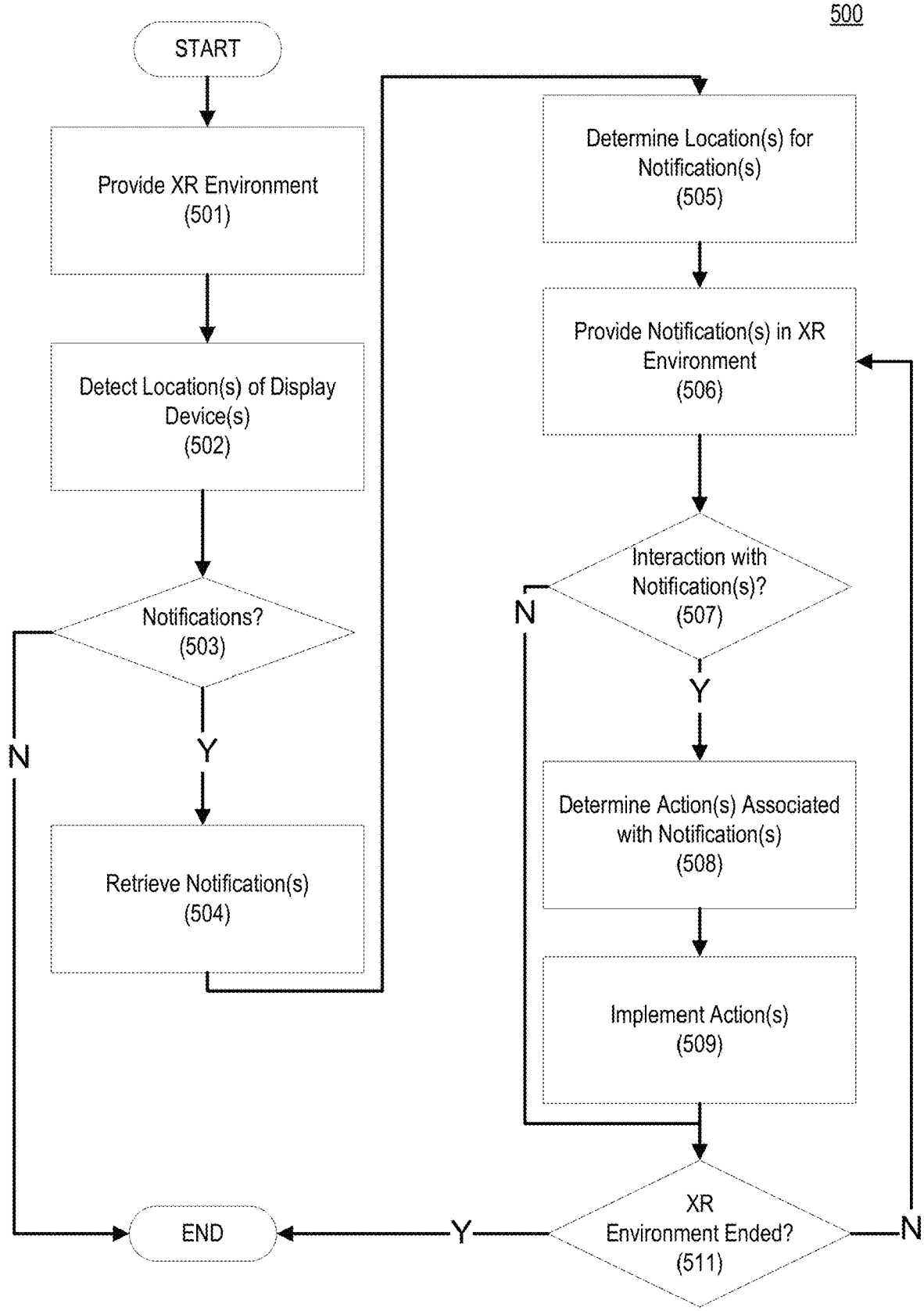
FIG. 5 depicts a flow chart for handling notifications in an XR environment.

FIG. 5 depicts a flow chart depicting steps of a method 500 for implementing notifications in XR environments. The steps shown in FIG. 5 may be performed by all or portions of a computing device, such as the external computing device 204, the internal computing device 201, the server 301, or the like. A computing device comprising one or more processors and memory storing instructions may be configured such that the instructions, when executed, cause performance of one or more of the steps of FIG. 5. The steps depicted in FIG. 5 are illustrative, and may be rearranged or omitted as desired.

In step 501, the computing device may provide an XR environment. The XR environment may be provided by an XR device, such as the XR device 202. For example, the computing device may provide, to a user and via an XR device, an XR environment. The XR environment may be all or portions of a virtual reality, augmented reality, and/or mixed reality environment. As such, the XR environment may display one or more virtual elements (e.g., elements generated by the internal computing device 201 and/or the external computing device 204) and/or one or more real-life physical elements (e.g., objects in a physical environment around the XR device 202).

In step 502, the computing device may detect one or more first locations of one or more display devices. For example, the computing device may receive images via the cameras 203d of the XR device 202, and those images may indicate the location of one or more display devices. At least one first display device of the one or more display devices may be in a physical environment around the XR device. For example, a physical environment around the XR device 202 may comprise three display devices: a laptop, a television screen, and an external monitor. The XR device 202 might receive images of the physical environment from the cameras 203d of the XR device 202, then use one or more object recognition algorithms to identify the display devices in the images. Once identified as display devices (e.g., through use of the aforementioned object recognition algorithms), the location of the display devices might be identified.

Determining the location of display devices may entail use of one or more location algorithms executing on the XR device. The XR device 202 might execute (e.g., via the internal computing device 201, the external computing device 204, and/or some combination thereof) an algorithm which maps the surrounding physical environment of the XR device 202. Such a process may be used to, for example, track input devices and/or walls in the physical environment. In turn, such a process might be leveraged to track the relative location of a display device in the physical environment.

Determining the location of display devices may entail use of computer vision image processing. The computing device may capture, using an imaging device of the XR device (e.g., the cameras 203*d* of the XR device 202), one or more images of the physical environment around the XR device. Rectangular-style portions of the images might be identified using computer vision image processing. Then, heuristics might be used to identify portions of images likely to be a display device. For example, heuristics might require that horizontal edges of a display device be straight.

Determining the location of display devices may entail use of a machine learning model. Over time, it may be desirable to use a machine learning model to determine whether certain objects in images are display devices. The computing device may capture, using an imaging device of the XR device (e.g., the cameras 203*d* of the XR device 202), one or more images of the physical environment around the XR device. The computing device may then provide, to a trained machine learning model, input comprising the one or more images. That trained machine learning model may have been trained to identify display devices based on training data comprising a plurality of different images. Each of the plurality of different images may comprise, for example, at least one display device, including information indicating the location of the display device in the image. The training data might have been divided in a K-fold strategy, whereby images were split for testing, training, and validation. In this manner, the machine learning model might be trained to learn where display devices are in images. The computing device may then receive, from the trained machine learning model, output comprising an indication of the location(s) of display device(s).

The display devices detected in step 502 need not all be physical display devices. The XR device 202 may provide, in an XR environment, one or more virtual displays which might operate in a similar fashion to physical displays in the user's physical environment. For example, a user might be presented, in an XR environment and via the display devices 203*a* of the XR device 202, images corresponding to physical display devices (e.g., a video feed, captured via the cameras 203*d*, of a real-life display device in the physical environment of the user) as well as images corresponding to virtual display devices (e.g., those generated and displayed in the XR environment, but which do not correspond to real-world physical displays). In turn, at least one second display device of the one or more display devices may be a virtual display device generated by the XR device.

In step 503, the computing device may determine whether there are any notifications for display in the XR environment. If there are notifications for display in the XR environment, the method 500 proceeds to step 504. Otherwise, the method 500 ends. Determining whether notifications exist may comprise querying one or more databases to determine whether notifications exist. For example, the computing device might query a database of notifications using a user identifier corresponding to a user of the XR device 202 to determine if any notifications exist for that user. Additionally and/or alternatively, determining whether notifications exist may comprise receiving, from a second computing device, one or more notifications. For example, the computing device might receive notifications as a push notification, without needing to request that notification.

In step 504, and based on determining that there are notifications for display in the XR environment, the computing device may retrieve one or more notifications for display in the XR environment. For example, the computing device may retrieve, from a server, one or more notifications for display in the XR environment. As indicated above, the notifications may be received in response to a query to a database, and/or might be received as data from a second computing device.

The particular format of the notifications received in step 504 might vary, as notifications may comprise one or more of text, images, audio, video, or the like. In some instances, the notifications might comprise text data (e.g., "Meeting at 4:00 PM"). Additionally and/or alternatively, in instances where the notifications have been captured from a physical environment (e.g., as images through the cameras 203*d* of the XR device 202), the notifications might comprise portions of images (e.g., portions of the images captured through the cameras 203*d* of the XR device 202). Additionally and/or alternatively, the notifications might comprise images received from other sources, such as via another computing device (e.g., using the snipping tool of an operating system). Additionally and/or alternatively, the notifications might comprise video content, such as a video recording from a smartphone. Additionally and/or alternatively, the notifications might comprise audio content, such as a voice recording captured by a user.

Retrieving the one or more notifications may entail processing images of a physical environment around the XR device. A user might already have a number of physical notifications in the way of sticky notes, scraps of paper about their desk, or the like. The computing device may capture, using an imaging device of the XR device, one or more images of the physical environment around the XR device. These images might comprise information which might be used to generate one or more notifications: for example, if the images capture a sticky note, then the captured portion of the sticky note might be used to generate an electronic notification. As such, the computing device may determine, based on the one or more images, at least one notification. This process might entail Optical Character Recognition (OCR). For example, the computing device may determine text in the one or more images using an OCR algorithm, then determine at least one notification based on that text. The computing device may then send, to the server, the at least one notification, wherein the one or more notifications comprise the at least one notification. As such, one advantage of the present disclosure is that it might efficiently translate physical notifications made by a user (e.g., written sticky notes) into a digital format such that those notifications might be available to the user across a wide variety of workstations.

Notifications may be created by a user in a variety of ways. Notifications might be created by a user of a computing device. For example, the computing device may receive, from the user, a selection of content (e.g., text, one or more images, one or more videos, one or more audio files, or the like). The computing device may then generate, based on the content, at least one notification. For example, based on a user highlighting and selecting "4:00 PM Meeting" in a calendar application, a notification might be generated that states "Calendar: Meeting at 4:00 PM." The computing device may then send, to the server, the at least one notification, wherein the one or more notifications comprise the at least one notification. In this manner, the user might be able to perform steps to capture content displayed on a computing device (e.g., text on a web page) and turn it into a notification. For example, a user might select content in a web/system-as-a-service (SaaS) application, right-click the selected content, and select a "save to notification" option in a drop-down menu in order to create a notification. Additionally and/or alternatively, the user may be capable of creating a notification in an XR environment. For example, a user might point to a vacant portion of the border of a display device in an XR environment and, in a user interface in the XR environment, create a new notification to be placed in that location.

Notifications may originate from applications. For example, output from an application may be configured as a notification. In this manner, for example, ordinary output of an application might be captured (e.g., via an operating system of a computing device executing the application), and the output might be translated into one or more notifications.

Notifications might have a variety of different properties. Some notifications may specify where they are to be displayed (e.g., in an office, in a user's home) and what context the notifications should be displayed in (e.g., whether the notification should be displayed only when an e-mail application is open). Notifications might correspond to physical notifications, such that the notifications may be displayed only when the physical notification (e.g., a real-life sticky note) is not in view in the XR environment. Notifications might comprise due dates, a list of items (e.g., a to-do list, with items that might be capable of being crossed out), or the like. Notifications might specify whether they are personal or corporate, might specify a location where they should be displayed with relation to a monitor, and/or might specify a color (e.g., of a background a virtual form of the notification).

Notifications may be shared across multiple users. For example, different users in the same department of an organization might share notifications. One user (e.g., a boss) may be capable of providing another user (e.g., a subordinate) a notification. For example, two coworkers may be capable of generating and sending notifications to one another.

One way in which notes might be generated is through use of collaborative tools, such as conference room whiteboards. Two users might make notes on a conference room whiteboard. One or more XR devices might capture the content of this whiteboard, and/or (in the case where the whiteboard itself contains imaging devices or the like) the whiteboard itself might capture content written on it. Then, notifications might be generated based on the content. For example, if one of the users wrote "Meeting Tomorrow at 3" on the whiteboard, then a notification might be generated that indicates a meeting the next day at 3:00 PM EST.

Determining notifications might comprise use of a machine learning model. The computing device may capture, using an imaging device of the XR device (e.g., the cameras 203d of the XR device 202), one or more images of the physical environment around the XR device. The computing device may then provide, to a trained machine learning model, input comprising the one or more images. That trained machine learning model may have been trained to identify physical notifications (e.g., sticky notes) based on training data comprising a plurality of different images. Each of the plurality of different images may comprise, for example, a notification in a different location (e.g., on a desk, on a monitor). The training data might have been divided in a K-fold strategy, whereby images were split for testing, training, and validation. In this manner, the machine learning model might be trained to learn where notifications are in images. The computing device may then receive, from the trained machine learning model, output comprising an indication of which portions of the image(s) comprise notification(s).

In step 505, the computing device may determine one or more second locations for the notifications retrieved in step 504. The notifications might be placed in locations in the XR environment relative to the locations of the one or more display devices determined in step 502. As such, the computing device may determine, based on the one or more first locations of the one or more display devices, one or more second locations for the one or more notifications. The one or more second locations might comprise, for example, a border of one or more display devices (akin to the way notifications are portrayed in FIG. 4). The one or more second locations might be based on the content being displayed on a display device. For example, in the circumstance where only a portion of a display device is being used (e.g., where a window is located on the left-hand side of a monitor but the right-hand side is not displaying content), the notifications might be located on the unused portion of the display device.

Determining the one or more second locations may be based on a priority level of notifications. It may be desirable to display high-priority notifications in locations which indicate their relative priority and/or which gain attention of the user. As such, where a plurality of different locations for a notification exist, the notification might be located based on its priority level. Moreover, where a plurality of different notifications are available for display, the locations of those notifications might be based on their relative priority level with respect to one another. For example, the computing device may determine the one or more second locations based on a priority level of each of the one or more notifications.

Determining the one or more second locations may be based on the context of activity by a user. Depending on the location of a user, the applications open on one or more computing devices, the time of day, and other considerations, different notifications may be displayed. For example, different notifications may be displayed in the morning as compared to the afternoon. As another example, different notifications may be displayed when a user is using an e-mail application as compared to when a user is using a web browser application. As another example, different notifications may be displayed when a user is in a conference room as compared to an office.

Determining the one or more second locations may be based on a number of display devices. A different quantity of notifications may be displayed when multiple display devices are present as compared to when a single display device is present. After all, when multiple display devices are present, more space may be available for display of notifications. With that said, in instances when display devices are placed side-by-side, certain sides of the display devices may be unavailable for notifications (as, after all, placing a notification at the shared edge might inadvertently obscure portions of the display devices). As such, in multi-display device scenarios, all edges of the display devices may not be available for display of notifications.

Determining the one or more second locations may entail use of a machine learning model. Over time, it may be desirable to use a machine learning model to determine the ideal location for various notifications, considering factors such as where users have placed real-life notifications (e.g., physical sticky notes) before. The computing device may capture, using an imaging device of the XR device (e.g., the cameras 203d of the XR device 202), one or more images of the physical environment around the XR device. The computing device may then provide, to a trained machine learning model, input comprising the one or more images. That trained machine learning model may have been trained to indicate notification locations based on training data comprising a plurality of different images. Each of the plurality of different images may comprise, for example, at least one display device. Each of the plurality of different images may comprise one or more written notes nearby the at least one display device. Additionally and/or alternatively, each of the plurality of different images may comprise empty regions (e.g., blank space nearby a desktop monitor) where notifications might be placed. In this manner, the machine learning model might be trained to learn where users have placed notifications (e.g., sticky notes) before in a variety of different circumstances and with respect to a variety of different display devices. Additionally and/or alternatively, the machine learning model might be trained to learn where empty space may exist near one or more display devices, such that the machine learning model might know where notifications may be placed. The computing device may then receive, from the trained machine learning model, output comprising an indication of the one or more second locations. In this manner, the trained machine learning model might provide a recommendation of a location for one or more notifications based on a history of where other notifications have been located with respect to display devices.

One way in which the machine learning model may be used is to detect regions where notifications may be placed. A machine learning model may be trained to determine regions where notifications may be placed. As part of such training, the machine learning model may be provided a plurality of images, each comprising one or more display devices. Such images might be tagged, such as with indications of the bounding boxes of those display devices. The machine learning model may be thereby trained to identify one or more regions of display devices, which may indicate where notifications may be placed. For example, the trained machine learning model may be provided, as input, an image of a computer monitor. The trained machine learning model may determine one or more dimensions of the computer monitor, and output data relating to those dimensions. For instance, the data may indicate locations, on the computer monitor, where notifications may be placed.

Additionally and/or alternatively, determining the one or more second locations may comprise determining locations where no content is being displayed. It may be desirable to display notifications in locations where other content (e.g., content displayed by a computer screen, content on physical objects such as notebooks and sticky notes) is not obscured. In turn, determining the one or more second locations may comprise determining that the one or more second locations are not already associated with (e.g., currently displaying) content, whether on a display screen, on a physical item, or the like. For example, the computing device may determine the one or more second locations in a manner that excludes regions associated with user input devices (e.g., a keyboard, which a user might look at if unfamiliar with typing), physical notes (e.g., real-world sticky notes, reference manuals on a desk), digital content (e.g., a screen of a smartphone), or the like. Additionally and/or alternatively, the computing device may determine the one or more second locations in a manner which may include, for example, blank walls, doors, or the like.

Determining the one or more second locations may entail use of a bounding box. A bounding box might represent a boundary of one or more display devices. An example of such a bounding box is provided in FIG. 6, which is discussed below. The computing device may determine a bounding box corresponding to a first display device of the one or more display devices. The computing device may then determine the one or more second locations based on the bounding box. In this manner, the computing device might determine one or more locations for placing one or more notifications around the boundary of a display device.

A user may be capable of modifying the one or more second locations. A user may be capable of moving (e.g., dragging and dropping) virtual objects corresponding to notifications into new locations. Based such actions, the one or more second locations may be modified.

The one or more second locations may be saved to, e.g., a database. In this manner, notifications might be consistently placed in the same locations when a user is near the same display devices. When a user modifies the one or more second locations, those modified one or more second locations may be saved. In this manner, the computing device may store and implement user preferences as to the location of notifications.

In step 506, the computing device may provide the notifications in the XR environment at the locations determined in step 505. This may comprise rendering one or more virtual objects corresponding to one or more notifications in an XR environment. For example, the computing device may provide, in the XR environment and at the one or more second locations, the one or more notifications.

In some circumstances, notifications might correspond to physical notifications in the physical environment of the user. For example, a notification might correspond to a sticky note at the workstation of a user. As such, when the user is at their workstation, a virtual object need not be rendered in the XR environment, as the physical notification is still visible. That said, as will be detailed below, the user might nonetheless be capable of interacting with the physical notification in the XR environment so as to cause performance of an action. Moreover, additionally and/or alternatively, a virtual object corresponding to a notification may be superimposed over a physical location.

The notifications may be provided in a manner that indicates their priority. For example, higher priority notifications may be of a special color (e.g., red), may change colors (e.g., may pulse red), may animate (e.g., shake), and/or may make sound. In this manner, high priority notifications may call the user's attention more readily than relatively lower priority notifications.

In step 507, the computing device may determine whether a user has interacted with the notifications provided in step 506. An interaction may be any action (e.g., movement) taken by a user with respect to a notification, whether or not it is a virtual object (e.g., rendered as part of step 506). For example, the computing device may receive, in the XR environment, a user interaction with a first notification of the one or more notifications. If so, the method 500 proceeds to step 507. Otherwise, the method 500 proceeds to step 511.

The interaction determined in step 507 might be with respect to a physical note. For example, a computing device may receive, in the XR environment, a user interaction with a physical note in the physical environment around the XR device. In this manner, the user might be interacting, in an XR environment, with a physical object, rather than a virtual object. This physical note might correspond to a notification. In turn, the computing device may determine a first notification corresponding to the physical note. For example, the physical note might correspond to a notification stored by a server, but no virtual object might have been rendered as part of step 506 because the physical note might be in view of the user (such that rendering of a virtual object would be unnecessary).

In step 508, the computing device may determine one or more actions associated with the notifications that the interacted with. For example, the computing device may determine an action associated with the first notification. An action may be any step which may be taken by a computing device. For example, for a notification relating to an online meeting, the action corresponding to the notification may cause a virtual conferencing application to open. As another example, for a notification relating to a call, the action corresponding to the notification may cause a smartphone to dial a phone number. As yet another example, for a notification relating to a drafting task, the action corresponding to the notification may cause a laptop to open a word processing application.

The action may relate to the notification itself. For example, certain types of interactions (e.g., a swipe towards a virtual trash can) might cause a notification to be deleted. As another example, certain types of interactions (e.g., a left-to-right movement of two fingers near a notification) might cause an item in a to-do list on a notification to be crossed out. As yet another example, certain types of interactions (e.g., dragging and dropping) might cause a notification to move to a different location. As yet another example, certain types of interactions may cause display of a blank notification (e.g., an empty opaque rectangle), which may provide a user the ability to provide content (e.g., through a keyboard and/or through voice input) and thereby create a new notification. As yet another example, a user may interact with a notification, causing the notification to be replaced (e.g., replaced with a blank opaque rectangle), obscured, darkened, or otherwise modified to indicate that the notification has been addressed.

In step 509, the computing device may implement the one or more actions determined in step 508. Implementing the one or more actions may comprise causing the one or more actions to be performed by one or more computing devices. For example, the computing device may provide, via a second computing device, a user interface associated with the action. The computing device that performs the action in step 509 need not be, for example, The external computing device 204 and/or the internal computing device 201. For example, based on a user gesturing towards a notification, the external computing device 204 may be configured to transmit, over a network, data configured to cause a smartphone to execute an application. Additionally and/or alternatively, the notification may comprise causing an XR device to display content in an XR environment. For example, responsive to a user gesturing towards a virtual notification in an XR environment, the XR environment may display additional information about the notification.

The action may comprise performing some action based on data in the notification. For example, if a notification contains a phone number, then the action may comprise dialing the phone number. As another example, if the notification comprises a Uniform Resource Locator (URL), the action may comprise opening a web browser and navigating to the URL. As yet another example, if the notification comprises an e-mail address, the action may comprise entering the e-mail into a "to" field of an e-mail application.

The action may comprise modifying settings of one or more computing devices. For example, an action may comprise connecting to a wireless network, modifying the volume of output audio, or the like. In this manner, for instance, a user might gesture towards a video notification, and a video corresponding to the notification might play in a smartphone. In that example, if the smartphone is muted, as part of the action, the smartphone might be unmuted.

A user may be capable of selecting which device performs the action specified by a notification. For example, for a notification comprising a phone number, the user may be capable of specifying which device (e.g., a desktop phone, a smartphone) dials the phone number when the notification is selected.

In step 510, the computing device may determine whether the extended reality environment has ended. This step may, in practice, implement a loop, whereby the user is provided the notifications and given the opportunity to interact with the notifications as desired. If the environment has ended, the method 500 ends. Otherwise, if the XR environment has not ended, the method 500 proceeds back to step 506.

Figure 6:
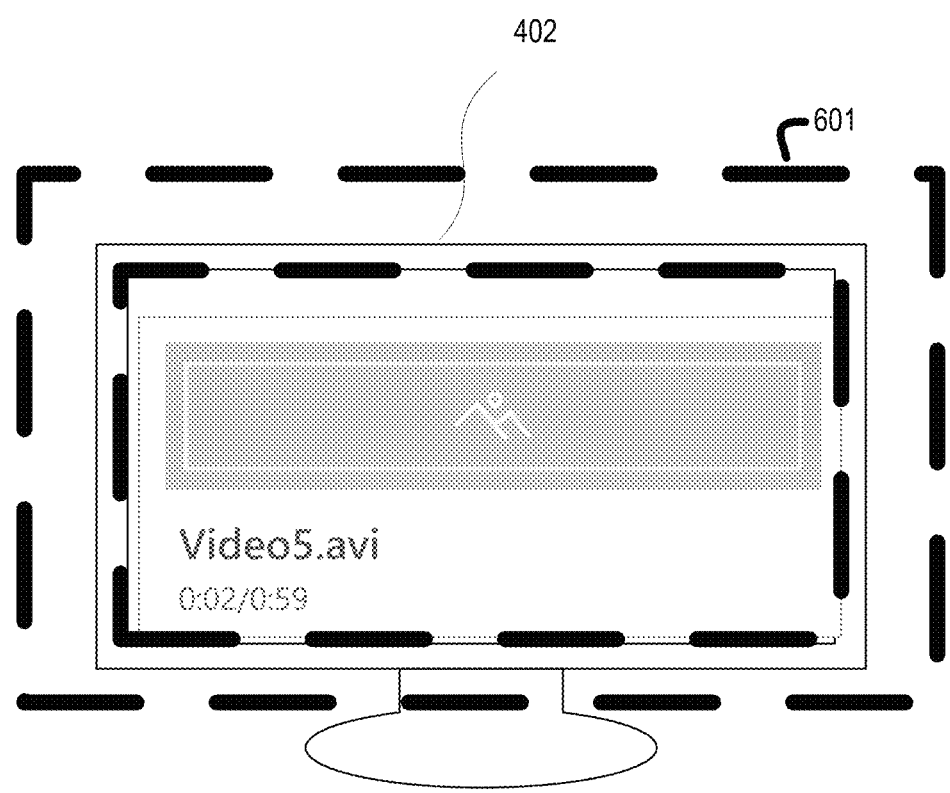
FIG. 6 depicts a bounding box for notifications to be displayed around a display device in a physical environment.

FIG. 6 depicts a bounding box 601 for the second monitor 402, which is shown displaying video content. FIG. 6 illustrates one way in which a bounding box might be determined over content displayed by the second monitor 402. In this example, the bounding box has been drawn in a manner that indicates that notifications (e.g., virtual sticky notes) might be presented in various locations around the second monitor 402.

Figure 7:
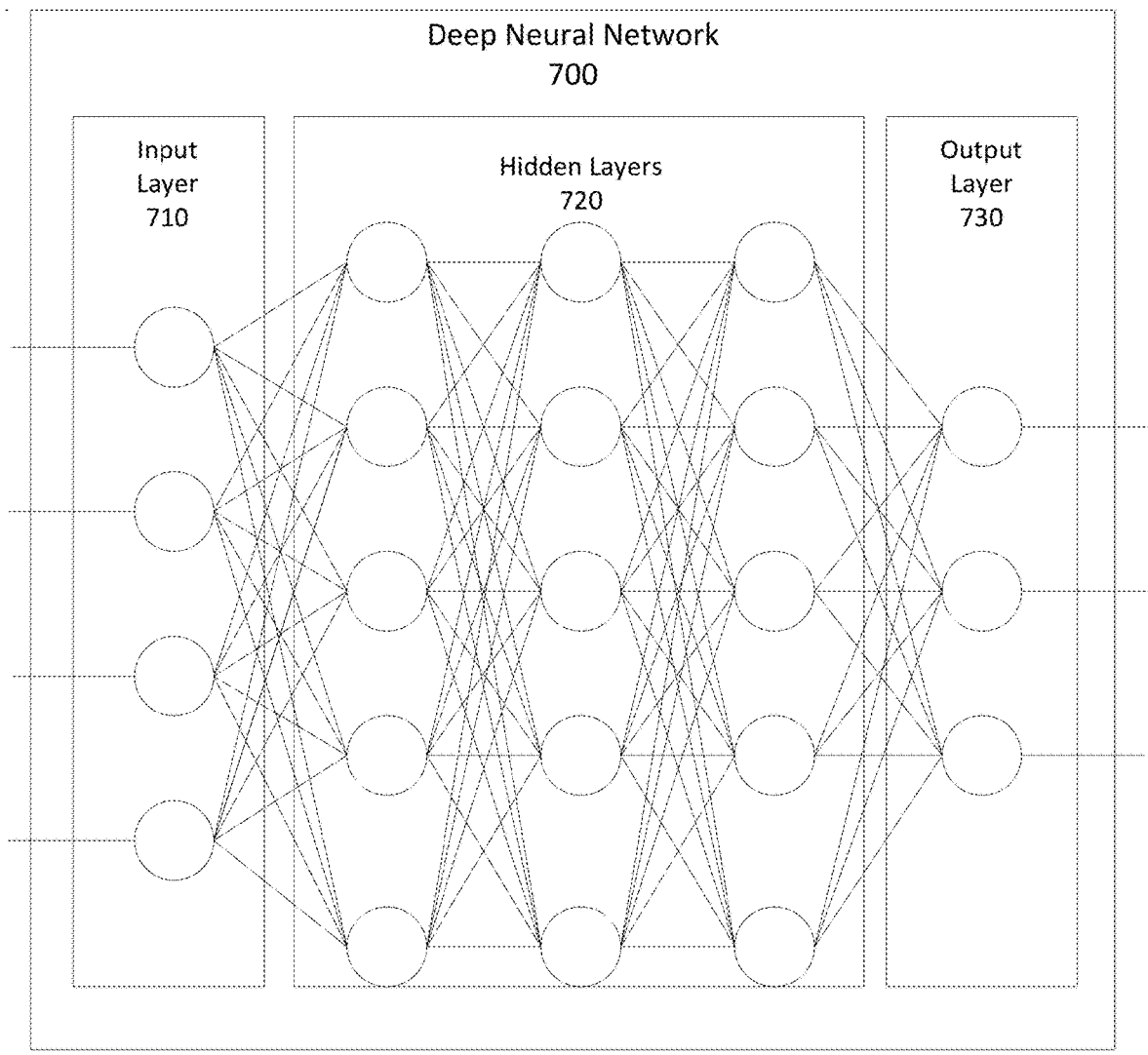
FIG. 7 depicts an example deep neural network architecture for a model according to one or more aspects of the disclosure.

FIG. 7 depicts an example deep neural network architecture 700. The architecture depicted in FIG. 7 need not be performed on a single computing device, and may be performed by, e.g., a plurality of computers (e.g., any one of the devices depicted in FIG. 1 or FIG. 2). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 710, one or more hidden layers 720, and an output layer 730. A deep neural network, as used herein, may be an artificial network that has more than one hidden layer. Illustrated network architecture 700 is depicted with three hidden layers, and thus may be considered a deep neural network. The number of hidden layers employed in deep neural network 700 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

The following paragraphs (M1) through (M10) describe examples of methods that may be implemented in accordance with the present disclosure.

(M1) A method comprising: providing, by a computing device to a user and via an extended reality (XR) device, an XR environment; detecting one or more first locations of one or more display devices, wherein at least one first display device of the one or more display devices is in a physical environment around the XR device; retrieving, from a server, one or more notifications for display in the XR environment; determining, based on the one or more first locations of the one or more display devices, one or more second locations for the one or more notifications; and providing, in the XR environment and at the one or more second locations, the one or more notifications.

(M2) A method may be performed as described in paragraph (M1) further comprising: capturing, using an imaging device of the XR device, one or more images of the physical environment around the XR device; determining, based on the one or more images, at least one notification; and sending, to the server, the at least one notification, wherein the one or more notifications comprise the at least one notification.

(M3) A method may be performed as described in paragraph (M2) wherein determining the at least one notification comprises: determining text in the one or more images using an Optical Character Recognition (OCR) algorithm; and determining the at least one notification based on the text.

(M4) A method may be performed as described in any one of paragraphs (M1)-(M3) further comprising: retrieving, in the XR environment, a user interaction with a first notification of the one or more notifications; determining an action associated with the first notification; and providing, via a second computing device, a user interface associated with the action.

(M5) A method may be performed as described in any one of paragraphs (M1)-(M4) wherein determining the one or more second locations comprises: determining a bounding box corresponding to a first display device of the one or more display devices; and determining the one or more second locations based on the bounding box.

(M6) A method may be performed as described in any one of paragraphs (M1)-(M5), wherein determining the one or more second locations comprises: capturing, using an imaging device of the XR device, one or more images of the physical environment around the XR device; providing, to a trained machine learning model, input comprising the one or more images, wherein the trained machine learning model has been trained to indicate notification locations based on training data comprising a plurality of different images, wherein each of the plurality of different images comprise: at least one display device; and one or more written notes nearby the at least one display device; and receiving, from the trained machine learning model, output comprising an indication of the one or more second locations.

(M7) A method may be performed as described in any one of paragraphs (M1)-(M6) further comprising: receiving, from the user, a selection of text; generating, based on the text, at least one notification; and sending, to the server, the at least one notification, wherein the one or more notifications comprise the at least one notification.

(M8) A method may be performed as described in any one of paragraphs (M1)-(M7), wherein determining the one or more second locations is based on a priority level of each of the one or more notifications.

(M9) A method may be performed as described in any one of paragraphs (M1)-(M8), wherein at least one second display device of the one or more display devices is a virtual display device generated by the XR device.

(M10) A method may be performed as described in any one of paragraphs (M1)-(M9), further comprising: receiving, in the XR environment, a user interaction with a physical note in the physical environment around the XR device; determining a first notification corresponding to the physical note; determining an action associated with the first notification; and providing a user interface associated with the action.

The following paragraphs (A1) through (A10) describe examples of apparatuses that may be implemented in accordance with the present disclosure.

(A1) A computing device comprising: one or more processors; and memory storing instructions that, when executed by the one or more processors, cause the computing device to: provide, to a user and via an extended reality (XR) device, an XR environment; detect one or more first locations of one or more display devices, wherein at least one first display device of the one or more display devices is in a physical environment around the XR device; retrieve, from a server, one or more notifications for display in the XR environment; determine, based on the one or more first locations of the one or more display devices, one or more second locations for the one or more notifications; and provide, in the XR environment and at the one or more second locations, the one or more notifications.

(A2) An apparatus as described in paragraph (A1), wherein the instructions, when executed by the one or more processors, further cause the computing device to: capture, using an imaging device of the XR device, one or more images of the physical environment around the XR device; determine, based on the one or more images, at least one notification; and send, to the server, the at least one notification, wherein the one or more notifications comprise the at least one notification.

(A3) An apparatus as described in paragraph (A2), wherein the instructions, when executed by the one or more processors, further cause the computing device to determine the at least one notification by causing the computing device to: determine text in the one or more images using an Optical Character Recognition (OCR) algorithm; and determine the at least one notification based on the text.

(A4) An apparatus as described in any one of paragraphs (A1)-(A3), wherein the instructions, when executed by the one or more processors, further cause the computing device to: receive, in the XR environment, a user interaction with a first notification of the one or more notifications; determine an action associated with the first notification; and provide, via a second computing device, a user interface associated with the action.

(A5) An apparatus as described in any one of paragraphs (A1)-(A4), wherein the instructions, when executed by the one or more processors, further cause the computing device to determine the one or more second locations by causing the computing device to: determine a bounding box corresponding to a first display device of the one or more display devices; and determine the one or more second locations based on the bounding box.

(A6) An apparatus as described in any one of paragraphs (A1)-(A5), wherein the instructions, when executed by the one or more processors, further cause the computing device to determine the one or more second locations by causing the computing device to: capture, using an imaging device of the XR device, one or more images of the physical environment around the XR device; provide, to a trained machine learning model, input comprising the one or more images, wherein the trained machine learning model has been trained to indicate notification locations based on training data comprising a plurality of different images, wherein each of the plurality of different images comprise: at least one display device; and one or more written notes nearby the at least one display device; and receive, from the trained machine learning model, output comprising an indication of the one or more second locations.

(A7) An apparatus as described in any one of paragraphs (A1)-(A6), wherein the instructions, when executed by the one or more processors, further cause the computing device to: receive, from the user, a selection of text; generate, based on the text, at least one notification; and send, to the server, the at least one notification, wherein the one or more notifications comprise the at least one notification.

(A8) An apparatus as described in any one of paragraphs (A1)-(A7), wherein the instructions, when executed by the one or more processors, further cause the computing device to determine the one or more second locations based on a priority level of each of the one or more notifications.

(A9) An apparatus as described in any one of paragraphs (A1)-(A8), wherein at least one second display device of the one or more display devices is a virtual display device generated by the XR device.

(A10) An apparatus as described in any one of paragraphs (A1)-(A9), wherein the instructions, when executed by the one or more processors, further cause the computing device to: receive, in the XR environment, a user interaction with a physical note in the physical environment around the XR device; determine a first notification corresponding to the physical note; determine an action associated with the first notification; and provide a user interface associated with the action.

The following paragraphs (CRM1) through (CRM10) describe examples of computer-readable media that may be implemented in accordance with the present disclosure.

(CRM1) One or more non-transitory computer-readable media storing instructions that, when executed by one or more processors of a computing device, cause the computing device to: provide, to a user and via an extended reality (XR) device, an XR environment; detect one or more first locations of one or more display devices, wherein at least one first display device of the one or more display devices is in a physical environment around the XR device; retrieve, from a server, one or more notifications for display in the XR environment; determine, based on the one or more first locations of the one or more display devices, one or more second locations for the one or more notifications; and provide, in the XR environment and at the one or more second locations, the one or more notifications.

(CRM2) An non-transitory computer-readable media as described in paragraph (CRM1), wherein the instructions, when executed by the one or more processors, further cause the computing device to: capture, using an imaging device of the XR device, one or more images of the physical environment around the XR device; determine, based on the one or more images, at least one notification; and send, to the server, the at least one notification, wherein the one or more notifications comprise the at least one notification.

(CRM3) An non-transitory computer-readable media as described in paragraph (CRM2), wherein the instructions, when executed by the one or more processors, further cause the computing device to determine the at least one notification by causing the computing device to: determine text in the one or more images using an Optical Character Recognition (OCR) algorithm; and determine the at least one notification based on the text.

(CRM4) An non-transitory computer-readable media as described in any one of paragraphs (CRM1)-(CRM3), wherein the instructions, when executed by the one or more processors, further cause the computing device to: receive, in the XR environment, a user interaction with a first notification of the one or more notifications; determine an action associated with the first notification; and provide, via a second computing device, a user interface associated with the action.

(CRM5) An non-transitory computer-readable media as described in any one of paragraphs (CRM1)-(CRM4), wherein the instructions, when executed by the one or more processors, further cause the computing device to determine the one or more second locations by causing the computing device to: determine a bounding box corresponding to a first display device of the one or more display devices; and determine the one or more second locations based on the bounding box.

(CRM6) An non-transitory computer-readable media as described in any one of paragraphs (CRM1)-(CRM5), wherein the instructions, when executed by the one or more processors, further cause the computing device to determine the one or more second locations by causing the computing device to: capture, using an imaging device of the XR device, one or more images of the physical environment around the XR device; provide, to a trained machine learning model, input comprising the one or more images, wherein the trained machine learning model has been trained to indicate notification locations based on training data comprising a plurality of different images, wherein each of the plurality of different images comprise: at least one display device; and one or more written notes nearby the at least one display device; and receive, from the trained machine learning model, output comprising an indication of the one or more second locations.

(CRM7) An non-transitory computer-readable media as described in any one of paragraphs (CRM1)-(CRM6), wherein the instructions, when executed by the one or more processors, further cause the computing device to: receive, from the user, a selection of text; generate, based on the text, at least one notification; and send, to the server, the at least one notification, wherein the one or more notifications comprise the at least one notification.

(CRM8) An non-transitory computer-readable media as described in any one of paragraphs (CRM1)-(CRM7), wherein the instructions, when executed by the one or more processors, further cause the computing device to determine the one or more second locations based on a priority level of each of the one or more notifications.

(CRM9) An non-transitory computer-readable media as described in any one of paragraphs (CRM1)-(CRM8), wherein at least one second display device of the one or more display devices is a virtual display device generated by the XR device.

(CRM10) An non-transitory computer-readable media as described in any one of paragraphs (CRM1)-(CRM9), wherein the instructions, when executed by the one or more processors, further cause the computing device to: receive, in the XR environment, a user interaction with a physical note in the physical environment around the XR device; determine a first notification corresponding to the physical note; determine an action associated with the first notification; and provide a user interface associated with the action.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computing device comprising:
   one or more processors; and
   memory storing instructions that, when executed by the one or more processors, cause the computing device to:
   provide, to a user and via an extended reality (XR) device, an XR environment;
   detect one or more first locations of one or more display devices, wherein at least one first display device of the one or more display devices is in a physical environment around the XR device;
   retrieve, from a server, one or more notifications for display in the XR environment;
   determine, based on the one or more first locations of the one or more display devices and based on whether content is displayed by the one or more display devices or displayed in the physical environment, one or more second locations for the one or more notifications that are not displaying the content;
   provide, in the XR environment and at the one or more second locations, the one or more notifications;
   based on determining an unused portion of one of the one or more display devices, determine a second location of the one or more second locations to be the unused portion; and
   provide, in the XR environment and at the second location, a notification of the one or more notifications.

2. The computing device of claim 1, wherein the instructions, when executed by the one or more processors, further cause the computing device to:
   capture, using an imaging device of the XR device, one or more images of the physical environment around the XR device;
   determine, based on the one or more images, at least one notification; and
   send, to the server, the at least one notification, wherein the one or more notifications comprise the at least one notification.

3. The computing device of claim 2, wherein the instructions, when executed by the one or more processors, further cause the computing device to determine the at least one notification by causing the computing device to:
   determine text in the one or more images using an Optical Character Recognition (OCR) algorithm; and
   determine the at least one notification based on the text.

4. The computing device of claim 1, wherein the instructions, when executed by the one or more processors, further cause the computing device to:
   receive, in the XR environment, a user interaction with a first notification of the one or more notifications;
   determine an action associated with the first notification; and
   provide, via a second computing device, a user interface associated with the action.

5. The computing device of claim 1, wherein the instructions, when executed by the one or more processors, further cause the computing device to determine the one or more second locations by causing the computing device to:
   determine a bounding box corresponding to a first display device of the one or more display devices; and
   determine the one or more second locations based on the bounding box.

6. The computing device of claim 1, wherein the instructions, when executed by the one or more processors, further cause the computing device to determine the one or more second locations by causing the computing device to:
   capture, using an imaging device of the XR device, one or more images of the physical environment around the XR device;
   provide, to a trained machine learning model, input comprising the one or more images, wherein the trained machine learning model has been trained to indicate notification locations based on training data comprising a plurality of different images, wherein each of the plurality of different images comprise:
   at least one display device; and
   one or more written notes nearby the at least one display device; and
   receive, from the trained machine learning model, output comprising an indication of the one or more second locations.

7. The computing device of claim 1, wherein the instructions, when executed by the one or more processors, further cause the computing device to:
   receive, from the user, a selection of text;
   generate, based on the text, at least one notification; and
   send, to the server, the at least one notification, wherein the one or more notifications comprise the at least one notification.

8. The computing device of claim 1, wherein the instructions, when executed by the one or more processors, further cause the computing device to:
   receive, in the XR environment, a user interaction with a physical note in the physical environment around the XR device;
   determine a first notification corresponding to the physical note;
   determine an action associated with the first notification; and
   provide a user interface associated with the action.

9. The computing device of claim 1, wherein the content displayed in the physical environment is displayed on one or more of: a notebook, a reference manual, a sticky note, or a user input device associated with the one or more display devices.

10. A method comprising:
    providing, by a computing device to a user and via an extended reality (XR) device, an XR environment;
    detecting one or more first locations of one or more display devices, wherein at least one first display device of the one or more display devices is in a physical environment around the XR device;
    retrieving, from a server, one or more notifications for display in the XR environment;
    determining, based on the one or more first locations of the one or more display devices and based on whether content is displayed by the one or more display devices or displayed in the physical environment, one or more second locations for the one or more notifications that are not displaying the content;
    providing, in the XR environment and at the one or more second locations, the one or more notifications;

based on determining an unused portion of one of the one or more display devices, determining a second location of the one or more second locations to be the unused portion; and providing, in the XR environment and at the second location, a notification of the one or more notifications.

11. The method of claim 10, further comprising:

capturing, using an imaging device of the XR device, one or more images of the physical environment around the XR device;

determining, based on the one or more images, at least one notification; and sending, to the server, the at least one notification, wherein the one or more notifications comprise the at least one notification.

12. The method of claim 11, wherein determining the at least one notification comprises:

determining text in the one or more images using an Optical Character Recognition (OCR) algorithm; and determining the at least one notification based on the text.

13. The method of claim 10, further comprising:

retrieving, in the XR environment, a user interaction with a first notification of the one or more notifications;

determining an action associated with the first notification; and providing, via a second computing device, a user interface associated with the action.

14. The method of claim 10, wherein determining the one or more second locations comprises:

determining a bounding box corresponding to a first display device of the one or more display devices; and determining the one or more second locations based on the bounding box.

15. One or more non-transitory computer-readable media storing instructions that, when executed by one or more processors of a computing device, cause the computing device to:

provide, to a user and via an extended reality (XR) device, an XR environment;

detect one or more first locations of one or more display devices, wherein at least one first display device of the one or more display devices is in a physical environment around the XR device;

retrieve, from a server, one or more notifications for display in the XR environment;

determine, based on the one or more first locations of the one or more display devices and based on whether content is displayed by the one or more display devices or displayed in the physical environment, one or more second locations for the one or more notifications that are not displaying the content;

provide, in the XR environment and at the one or more second locations, the one or more notifications;

based on determining an unused portion of one of the one or more display devices, determine a second location of the one or more second locations to be the unused portion; and provide, in the XR environment and at the second location, a notification of the one or more notifications.

16. The non-transitory computer-readable media of claim 15, wherein the instructions, when executed by the one or more processors, further cause the computing device to:

capture, using an imaging device of the XR device, one or more images of the physical environment around the XR device;

determine, based on the one or more images, at least one notification; and send, to the server, the at least one notification, wherein the one or more notifications comprise the at least one notification.

17. The non-transitory computer-readable media of claim 16, wherein the instructions, when executed by the one or more processors, further cause the computing device to determine the at least one notification by causing the computing device to:

determine text in the one or more images using an Optical Character Recognition (OCR) algorithm; and determine the at least one notification based on the text.

18. The non-transitory computer-readable media of claim 15, wherein the instructions, when executed by the one or more processors, further cause the computing device to:

receive, in the XR environment, a user interaction with a first notification of the one or more notifications;

determine an action associated with the first notification; and provide, via a second computing device, a user interface associated with the action.

19. The non-transitory computer-readable media of claim 15, wherein the instructions, when executed by the one or more processors, further cause the computing device to determine the one or more second locations by causing the computing device to:

determine a bounding box corresponding to a first display device of the one or more display devices; and determine the one or more second locations based on the bounding box.

* * * * *